(12) United States Patent
Aspen et al.

(10) Patent No.: US 8,260,545 B1
(45) Date of Patent: Sep. 4, 2012

(54) METHODS AND APPARATUS FOR GENERATING A NAVIGATION CHART

(75) Inventors: Sven D. Aspen, Sherwood, OR (US); Kevin S. Schlatter, Highlands Ranch, CO (US); Robert Henry, Castle Rock, CO (US); Stephen A. Lewis, Highlands Ranch, CO (US); Danny M. Price, Castle Rock, CO (US); Robert Black, Colorado Springs, CO (US)

(73) Assignee: The Boeing Company, Chicago, IL (US)

( * ) Notice: Subject to any disclaimer, the term of this patent is extended or adjusted under 35 U.S.C. 154(b) by 522 days.

(21) Appl. No.: 12/622,835

(22) Filed: Nov. 20, 2009

(51) Int. Cl.
*G01C 21/32* (2006.01)
(52) U.S. Cl. ........ 701/409; 701/467; 701/532; 701/493; 701/468; 701/470; 340/990; 340/995.18; 73/178 R; 348/113; 348/116; 283/34; 283/35
(58) Field of Classification Search .................. 701/467, 701/532, 455, 493, 468, 454, 533, 470, 409; 340/990, 995.18; 73/178 R; 348/113, 116; 283/34, 35
See application file for complete search history.

(56) References Cited

U.S. PATENT DOCUMENTS 6,901,331 B1 * 5/2005 Beckmann et al. ........... 701/468

OTHER PUBLICATIONS

Jon Christensen et al., "An Empirical Study of Algorithms for Point-Feature Label Placement," The Guide to Computing Literature, Jul. 1995, pp. 203-232, vol. 14 Issue 3, ISSN:0730-0301, ACM Transactions on Graphics (TOG).
Steven Woudenberg; "Label Placement", Information and Computing Sciences; Universiteit Utrect; Oct. 19, 2007; 37 pages.

* cited by examiner

*Primary Examiner* — Thomas Black
*Assistant Examiner* — Luke Huynh
(74) *Attorney, Agent, or Firm* — Armstrong Teasdale LLP (57) ABSTRACT

A method is described for generating a navigation chart. The navigation chart includes a plurality of allocated areas corresponding to symbols for a plurality of chart features. The method includes identifying an unallocated area of the navigation chart proximate to a symbol for one chart feature of the plurality of chart features. A first label and a second label are determined for the one chart feature. The first label includes a plurality of feature attribute indicators, and the second label includes a subset of the plurality of feature attribute indicators. A label is selected from among the first label and the second label based on dimensions of the unallocated area. At least a portion of the unallocated area is allocated to the selected label, and the navigation chart is displayed.

20 Claims, 9 Drawing Sheets

METHODS AND APPARATUS FOR GENERATING A NAVIGATION CHART

BACKGROUND

The field of the disclosure relates generally to displaying a navigation chart and, more specifically, to methods and apparatus for adjusting content and/or placement of symbols and/or labels based on available area in a navigation chart.

Navigation charts are used to plan and track aircraft flights. Initial computer displayed charts have been static pre-composed versions of traditional paper charts. Dynamic (e.g., real-time), electronically displayed navigation charts have additional challenges in terms of readability and operational approval for use by commercial operators. Dynamic, electronically displayed charts exist in other contexts, such as automotive navigation units. However, the context of dynamic aeronautical navigation demands more advanced display techniques than are available with existing implementations. For example, in an area of a chart with a high concentration of symbols and labels, known systems may omit labels for at least some symbols or abruptly move labels as a geographic position and/or orientation changes. Such compromises may impede interpretation of a chart and therefore be unacceptable in an aeronautical navigation system. For example, abrupt movement of labels is potentially distracting to a pilot.

BRIEF SUMMARY

In one aspect, a method for generating a navigation chart is provided. A first label and a second label are generated for a chart feature. The first label includes a plurality of feature attribute indicators, and the second label includes a subset of the plurality of feature attribute indicators. A label is selected from among the first label and the second label based on dimensions of the unallocated area. Technical effects include selection of chart feature labels based on available area within a navigation chart and placement of the chart feature labels within the navigation chart. The method may be practiced with three or more labels.

In another aspect, a system for generating a navigation chart is provided. The system includes a navigation instrument and a computing device. The navigation instrument is configured to provide a current geographic position. The computing device is configured to receive the current geographic position from the navigation instrument and generate a navigation chart having a geographic area corresponding to the current geographic position. The navigation chart also includes a plurality of chart feature symbols for a plurality of chart features within the geographic area. Each chart feature symbol corresponds to an allocated area of the navigation chart. The computing device is also configured to, for one chart feature of the plurality of chart features, identify an unallocated area of the navigation chart and select, based on dimensions of the unallocated area, a label from a first label having a plurality of feature attribute indicators and a second label having a subset of the plurality of feature attribute indicators. The second label is smaller that the first label. The computing device is further configured to allocate a portion of the navigation chart to the selected label and to cause the navigation chart to be displayed.

In yet another aspect, a device for generating a navigation chart is provided. The device includes an input device configured to receive a geographic position of interest and a processor coupled to the input device. The processor is programmed to generate a navigation chart having a geographic area corresponding to the geographic position of interest and a plurality of chart feature symbols corresponding to chart features having a geographic position within the geographic area. The processor is also programmed to, for one chart feature symbol of the plurality of chart feature symbols, determine a first label having a plurality of feature attribute indicators and a second label having a subset of the plurality of feature attribute indicators. The second label is smaller than the first label. The processor is further programmed to select a label from the first label and the second label based on dimensions of an unallocated area of the navigation chart and to allocate a portion of the navigation chart to the selected label. The device also includes a presentation device configured to display the navigation chart.

The features, functions, and advantages that have been discussed can be achieved independently in various embodiments of the invention or may be combined in yet other embodiments, further details of which can be seen with reference to the following description and drawings.

DETAILED DESCRIPTION

In various embodiments, an apparatus and method for displaying a navigation chart are described. A navigation chart includes a symbol and/or a label for one or more chart features. As used herein, the term "chart feature" refers to a navigation aid entity (e.g., an aeronautical, terrestrial, and/or naval navigation aid entity), a physical structure, a geographical feature, a geographical boundary, a geological feature, and/or a user-configured place mark, or any other entity, tangible or intangible, suitable for display within a navigation chart. Navigation aid entities may include, for example, a very high frequency omnidirectional radio range (VOR) station, a distance measuring equipment (DME) system, a tactical air navigation (TACAN) system, an airspace fix, a waypoint, an airport, special use airspace, air traffic service controlled airspace, a flight information region, a communication frequency sector boundary, and/or an airway. As described herein, the appearance of chart feature symbols and/or the content of labels may be adjusted based on available area within the navigation chart and/or a scale or zoom level of the navigation chart.

Embodiments described herein facilitate the dynamic composition and display of an aeronautical navigation chart. For example, a navigation chart may be continuously updated as an aircraft moves in relation to one or more ground locations. Chart features to be displayed may be retrieved from a database based on a current geographic location of the aircraft. In one embodiment, a plurality of labels are generated for a chart feature. The first label generated includes a plurality of feature attribute indicators. Each subsequent label includes a subset of the feature attribute indicators included in the label before it. The generated labels, therefore, may occupy various amounts of area when positioned in a navigation chart. A label is selected from among the plurality of labels based on dimensions of unallocated area within the navigation chart. In an exemplary embodiment, three labels (i.e., a detailed label, a regular label, and a simple label) are generated. However, the methods described herein are practicable with any quantity of labels.

Figure 1:
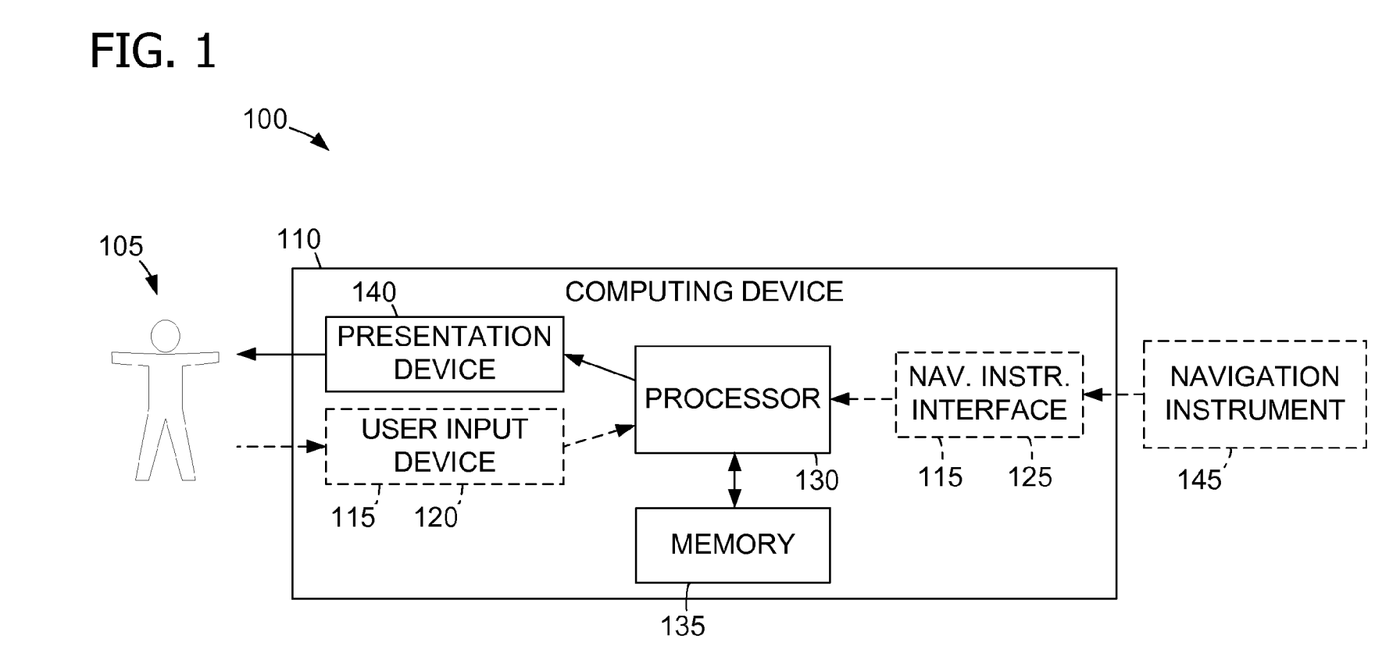
FIG. 1 is a block diagram illustrating a system for displaying a navigation chart in one embodiment of the invention.

FIG. 1 is a block diagram illustrating a system 100 for displaying a navigation chart. System 100 may be used, for example, by a user 105, such as a pilot. System 100 includes computing device 110. Computing device 110 includes an input device 115, such as a user input device 120 and/or a navigation instrument interface 125. Input device 115 is configured to receive a geographic position of interest.

Computing device 110 includes a processor 130 for executing instructions. In some embodiments, executable instructions are stored in a memory area 135. Computing device 110 is configurable to perform the operations described herein by programming processor 130. For example, a processor may be programmed by encoding an operation as one or more executable instructions and providing the executable instructions to the processor in memory area 135. Processor 130 may include one or more processing units (e.g., in a multi-core configuration). Memory area 135 is any device allowing information such as executable instructions and/or other data to be stored and retrieved. Memory area 135 may include one or more computer readable media.

Computing device 110 also includes at least one presentation device 140 for presenting information, such as a navigation chart, to user 105. In some embodiments, presentation device 140 includes a display adapter (not shown in FIG. 1), which is operatively coupled to processor 130 and operatively couplable to a display device, such as a cathode ray tube (CRT), a liquid crystal display (LCD), an organic light emitting diode (OLED) display, and/or an "electronic ink" display.

In some embodiments, computing device 110 includes user input device 120 for receiving input from user 105. User input device 120 may include, for example, functionally defined switches' and/or buttons, a keyboard, a pointing device, a mouse, a stylus, a touch sensitive panel (e.g., a touch pad or a touch screen), a gyroscope, an accelerometer, a position detector, and/or an audio input device. A single component such as a touch screen may function as both presentation device 140 and user input device 120.

Stored in memory area 135 are, for example, computer readable instructions for providing a user interface to user 105 via presentation device 140 and, optionally, receiving and processing input from input device 120. A user interface may include, among other possibilities, a navigation application and/or a web browser.

In some embodiments, memory area 135 is configured to store a plurality of chart features. Each chart feature is associated with one or more geographic positions and/or geographic extents. For example, a VOR station may correspond to a single geographic position, and an airway may correspond to two geographic positions defining a line segment.

A chart feature is also associated with one or more chart feature attributes. In one embodiment, a navigation aid entity includes a feature type (e.g., VOR station or waypoint), an identifier, a name, a radio frequency, a class, an on-airway flag (i.e., a true or false value), and/or a DME flag. Chart feature attributes 135 may be associated with chart features in memory area 135. In one embodiment, processor 130 is programmed to retrieve chart features from memory area 135. For example, processor 130 may retrieve chart features based on a geographic area of a navigation chart.

In some embodiments, input device 115 includes navigation instrument interface 125, which is communicatively couplable to a navigation instrument 145. Navigation instrument 145 is configured to provide a current geographic position and/or a current geographic orientation. For example, navigation instrument 145 may be configured to provide a current geographic position and/or orientation continuously, periodically, upon request, or upon a change in a geographic position and/or a geographic orientation, though other timings are also contemplated. Navigation instrument 145 may provide a geographic position by providing absolute geographic coordinates, a position (e.g., direction and/or distance) relative to one or more chart features, and/or any other suitable means of expressing a geographic position. Navigation instrument 145 may provide a geographic orientation by providing a cardinal direction, a heading (e.g., expressed in degrees), a direction relative to a chart feature, and/or any other suitable means of expressing a geographic orientation.

In other embodiments, input device 115 includes user input device 120. For example, user input device 120 may include a keyboard, with which user 105 enters a geographic position of interest, which may be expressed as absolute geographic coordinates, a city, and/or any other suitable means for indicating a geographic position, whether particularly or approximately. In another example, user input device 120 includes a pointing device (e.g., a mouse or a touch screen) configured to receive from user 105 a selection of a geographic position of interest within a map and/or a navigation chart displayed by presentation device 140. In addition, or alternatively, user input device 120 may include a keyboard, mouse, and/or other device with which user 105 specifies a geographic orientation. Computing device 110 may include both navigation instrument interface 125 and user input device 120.

Processor 130 is programmed to generate a navigation chart having a geographic area corresponding to the geographic position of interest. For example, processor 130 may identify a geographic area having the geographic position of interest as a center point. In one embodiment, processor 130 determines the geographic area based also on a pixel resolution of a display device coupled to or integrated with presentation device 140. The navigation chart generated by processor 130 also includes a plurality of chart feature symbols corresponding to chart features having a geographic position within the geographic area.

In some embodiments, processor 130 generates the navigation chart corresponding to both a geographic position of interest and a geographic orientation from input device 115. For example, processor 130 may generate a navigation chart having the geographic position of interest as a center point and rotated such that the geographic orientation extends in an upward direction from the center point. Processor 130 may be further programmed to maintain a constant rotational orientation of one or more chart feature symbols and/or labels, regardless of the geographic orientation and/or the rotation of the navigation chart. For example, a label may be maintained in a horizontal orientation to facilitate ease of reading the label.

Processor 130 may retrieve the plurality of chart features to include in the navigation chart from memory area 135. In one embodiment, processor 130 is programmed to select, from memory area 135, a plurality of chart features having a geographic position within the geographic area and generate a navigation chart having a plurality of chart feature symbols corresponding to the selected chart features. Processor 130 may include in the navigation chart a chart feature symbol corresponding to a feature type of each chart feature. In the exemplary embodiment, each chart feature symbol corresponds to an allocated area of the navigation chart.

Processor 130 is also programmed to, for one or more of the chart feature symbols, determine a first label having a plurality of feature attribute indicators and a second label having a subset of the plurality of feature attribute indicators. In an exemplary embodiment, processor 130 determines a third label having a subset of the feature attributes indicators included in the second label. The first, second, and third labels may be referred to as a detailed label, a regular label, and a simple label, respectively. For example, the detailed label for a VOR station may include a name indicator, an on-airway indicator, a DME indicator, a class indicator, a frequency indicator, and an identifier indicator. The regular label for the VOR station may include a name indicator, an on-airway indicator, and an identifier indicator. The simple label for the VOR station may include an identifier indicator. Any quantity of labels suitable for displaying a navigation chart as described herein may be used. A feature attribute indicator includes, but is not limited to, one or more textual characters, a glyph, an icon, an image, and/or a graphical feature, such as one or more lines and/or shapes.

Processor 130 is further programmed to select a label from the determined labels (e.g., the first and second labels) based on dimensions of an unallocated area of the navigation chart. In an exemplary embodiment, processor 130 selects the label including the most information that can be displayed in an unallocated area that is proximate to the chart feature symbol. For example, processor 130 may identify an unallocated area of the navigation chart proximate to (e.g., within a predetermined distance) the chart feature symbol. A predetermined distance may be expressed as a spatial value (e.g., millimeters or inches), as a quantity of pixels, and/or in any other suitable form. Processor 130 evaluates whether the first label is positionable within the unallocated area based on the dimensions of the first label and the dimensions of the unallocated area. If the first label is positionable within the unallocated area, the first label is selected. If not, the second label is selected. Similarly, if three labels are determined, processor 130 begins the selection process with the first label and continues to the second label and then to the third label.

In some embodiments, processor 130 is programmed to include in the navigation chart a chart feature symbol for one or more chart features based on available area within the navigation chart and/or a scale or zoom level of the navigation chart. In one embodiment, for each chart feature, processor 130 is programmed to determine a first chart feature symbol having a first size and a second chart feature symbol having a second size smaller than the first size. Processor 130 is also programmed to select a chart feature symbol from the first chart feature symbol and the second chart feature symbol based on dimensions of the first chart feature symbol, dimensions of the second chart feature symbol, dimensions of an unallocated area of the navigation chart and/or a scale of the navigation chart. Processor 130 is further programmed to allocate at least a portion of the navigation chart to the selected chart feature symbol. In another embodiment, processor 130 is programmed to determine a third chart feature symbol having a third size smaller than the second size and select a chart feature symbol from the first chart symbol, the second chart feature symbol, and the third chart feature symbol, as described above. Any quantity of chart feature symbols suitable for displaying a navigation chart as described herein may be used.

In some embodiments, processor 130 is programmed to position a connecting line or "leader" between a label and a chart feature symbol. A connecting line may include an arrowhead at the end proximate to the chart feature symbol. In one embodiment, processor 130 is programmed to determine a distance between a label and the corresponding chart feature symbol. Processor 130 is programmed to position a connecting line between the label and chart feature symbol if the determined distance exceeds a predetermined distance threshold. In addition, or in the alternative, processor 130 may be programmed to determine whether the least detailed label (i.e., the label including the fewest chart feature attribute indicators) is positionable within the unallocated area. If not, processor 130 may be programmed to determine an expanded unallocated area larger than the original unallocated area, position the least detailed label within the expanded unallocated area, and position a connecting line between the label and the chart feature symbol.

Processor 130 is also programmed to allocate a portion of the navigation chart to the selected label. In an exemplary embodiment, processor 130 allocates a portion of the navigation chart to a plurality of labels. The portion of the navigation chart allocated to a selected label is considered allocated area and is thus excluded from the unallocated area available for placement of subsequent labels. Presentation device 140 is configured to display the navigation chart.

Computing device 110 may produce a "live", "en route", or scrolling navigation chart. In some embodiments, navigation instrument interface 125 is configured to repeatedly receive a current geographic position and/or a current geographic orientation from navigation instrument 145. For example, navigation instrument interface 125 may receive a geographic position and/or a geographic orientation continuously, periodically, or upon a change in a geographic position and/or geographic orientation. In such embodiments, navigation instrument interface 125 receives a plurality of geographic positions and/or a plurality of geographic orientations at a plurality of times. Processor 130 is programmed to generate a plurality of navigation charts based on the geographic positions and/or geographic orientations. In one embodiment, processor 130 is programmed to generate a first navigation chart based on a first geographic position received at a first time, and presentation device 140 is configured to display the first navigation chart. Processor 130 is also programmed to generate a second navigation chart based on a second geographic position received at a second time, and presentation device 140 is configured to display the second navigation chart.

Processor 130 may be programmed to allocate portions of the navigation chart to chart feature symbols and/or labels, as described above, each time processor 130 generates a navigation chart. In some embodiments, processor 130 is programmed to allocate to a label a portion of the navigation chart proximate to the corresponding chart feature symbol and proximate to the area allocated to the label in a previous navigation chart. Such embodiments facilitate displaying an en route navigation chart with minimal changes in label placement.

Figure 2:
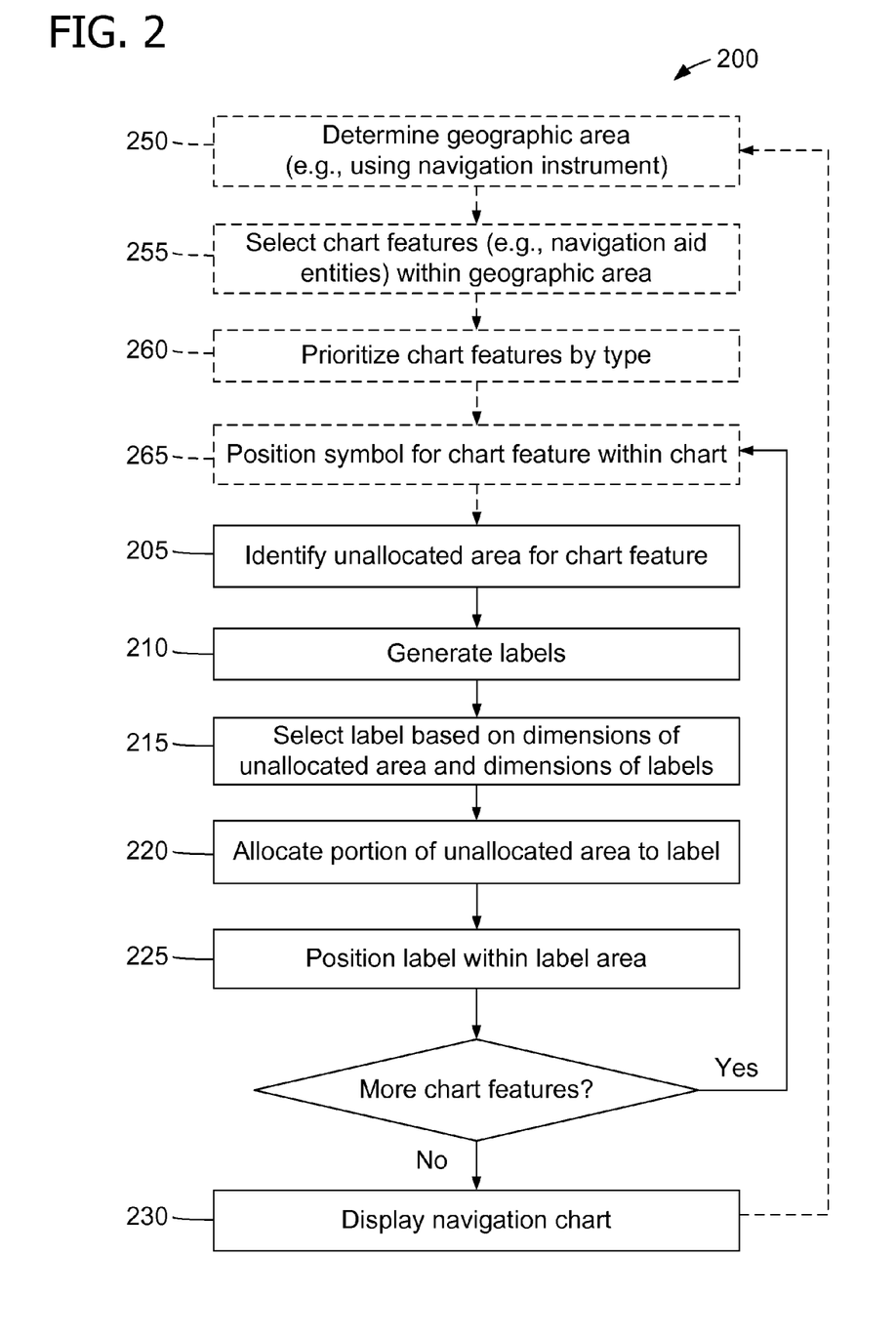
FIG. 2 is a flowchart illustrating an exemplary method for displaying a navigation chart.

FIG. 2 is a flowchart illustrating an exemplary method 200 for displaying a navigation chart having a plurality of allocated areas corresponding to symbols for a plurality of chart features. Method 200 is described below with reference to FIGS. 3-9.

Figure 3:
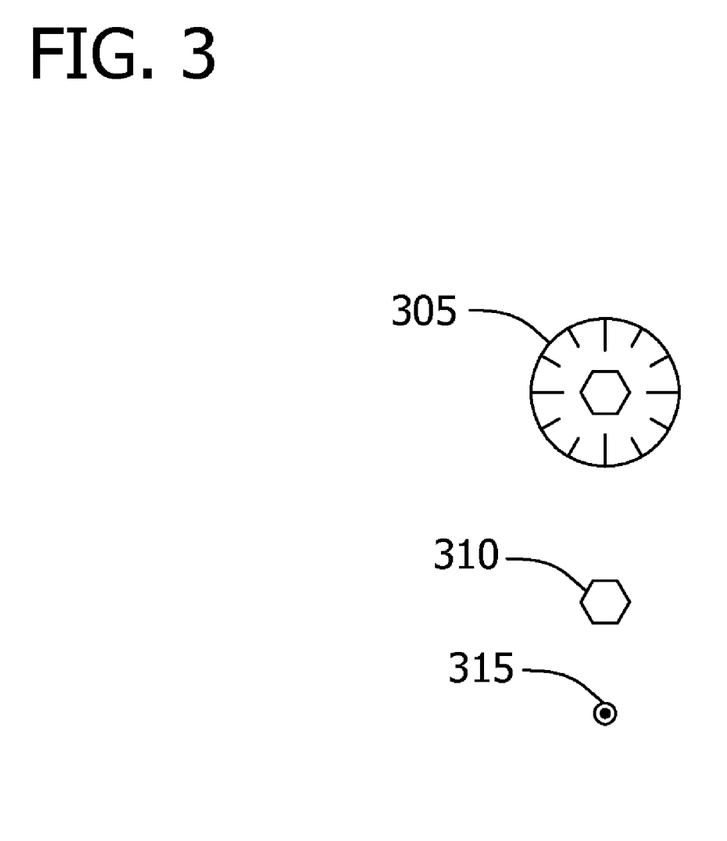
FIG. 3 is an illustration of exemplary chart feature symbols for a navigation chart.

FIG. 3 is an illustration of exemplary chart feature symbols for a navigation chart. Depicted are a detailed symbol 305, a regular symbol 310, and a simple symbol 315. In one embodiment, any one of detailed symbol 305, regular symbol 310, and simple symbol 315 may be used to represent a VOR station in a navigation chart. A symbol may be selected from detailed symbol 305, regular symbol 310, and simple symbol 315 based on dimensions of an unallocated area and/or a scale of a navigation chart, for example. One or more chart feature symbols may be defined for each of a plurality of feature types.

Figure 4:
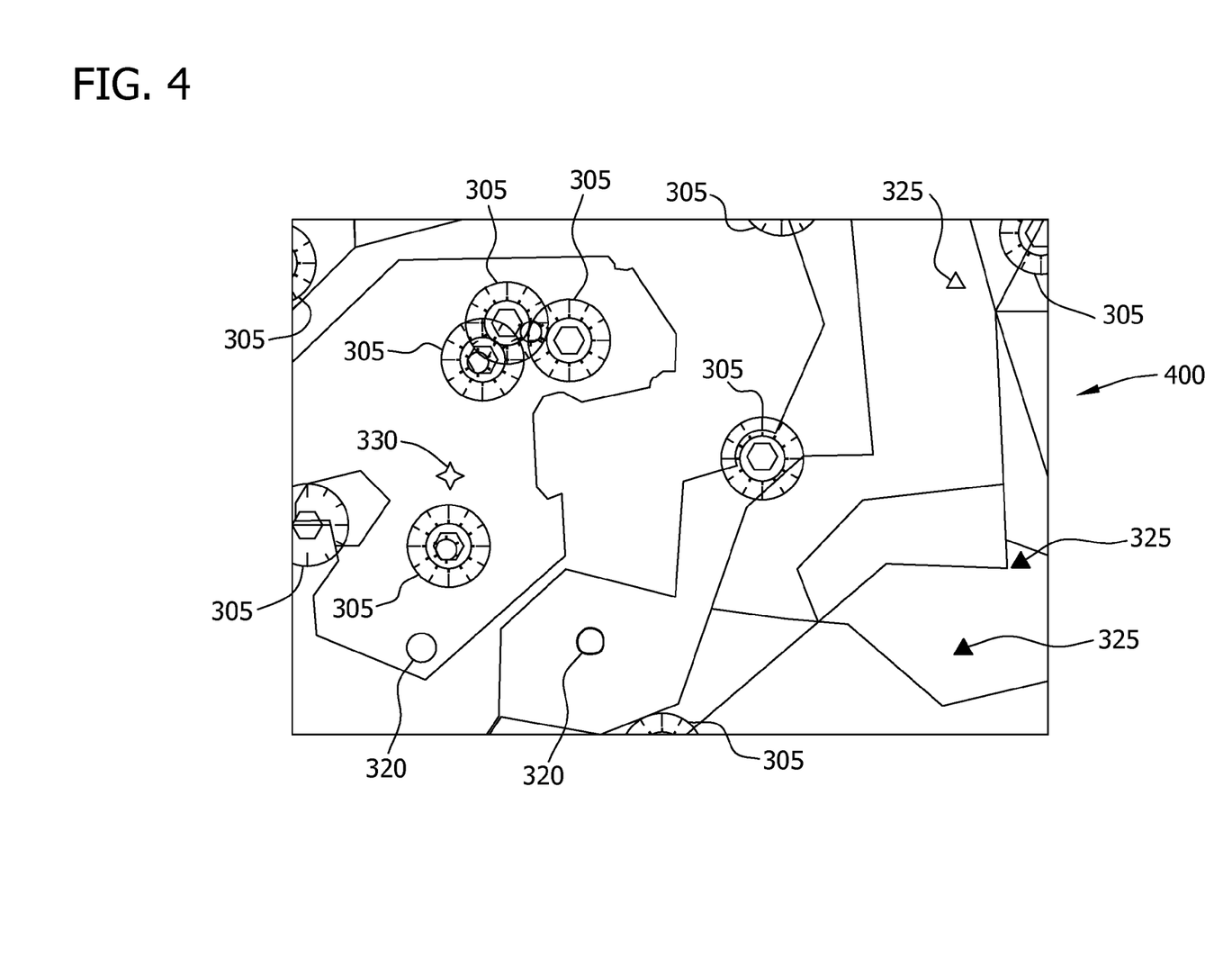
FIG. 4 is an exemplary navigation chart containing chart feature symbols.

FIG. 4 is an exemplary navigation chart 400 containing chart feature symbols, including a plurality of detailed symbols 305 for VOR stations. Navigation chart 400 also includes symbols 320 for airports, symbols 325 for airspace fixes, and a symbol 330 for a waypoint.

Figure 5:
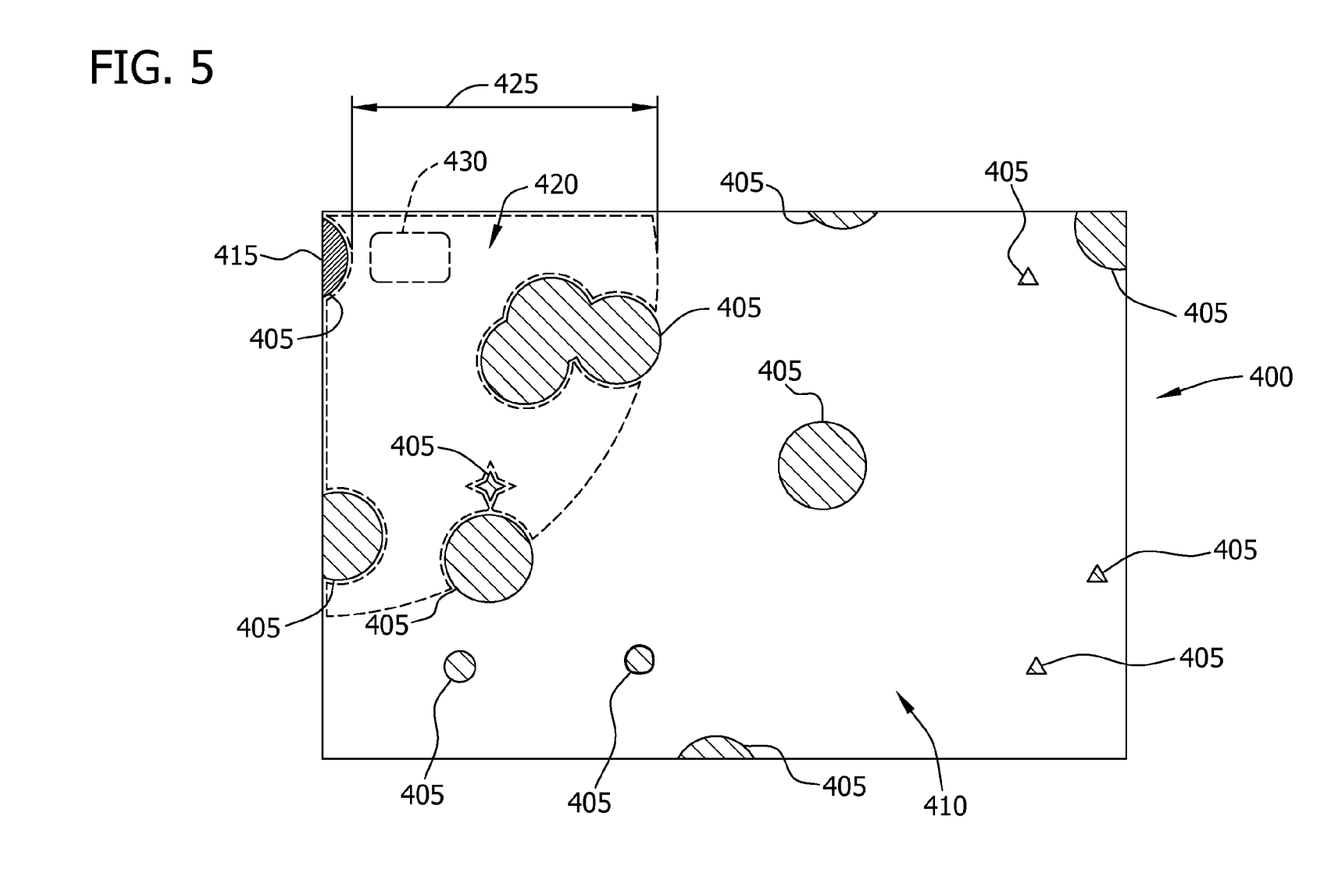
FIG. 5 is an illustration of allocated portions of the navigation chart shown in FIG. 4 as a label is selected for a chart feature.

Method 200 includes identifying 205 an unallocated area of the navigation chart for one of the chart features. In some embodiments, an unallocated area proximate to a symbol for the chart feature is identified 205. FIG. 5 is an illustration of allocated portions 405 and an unallocated portion 410 of navigation chart 400 as an unallocated area is identified 205 for a chart feature 415. Allocated portions 405 correspond to chart feature symbols and labels within navigation chart 400. In one embodiment, the entirety of unallocated portion 410 displayed in navigation chart 400 is identified 205 as the unallocated area for chart feature 415. In an alternative embodiment, identifying 205 the unallocated area includes identifying an unallocated area 420 within a predetermined distance 425 of the symbol for chart feature 415.

A plurality of labels, each including one or more feature attribute indicators, is generated 210 for the one chart feature. Each label includes fewer feature attribute indicators than the previous label. For example, a first label may include a plurality of feature attribute indicators, and a second label may include a subset of the feature attribute indicators included in the first label. The second label is smaller in size than the first label, such that the second label uses less of the unallocated area as described elsewhere herein. Additional labels may be generated, with each label having a subset of the feature attribute indicators included in the label before it and therefore being of a reduced size.

Figure 6:
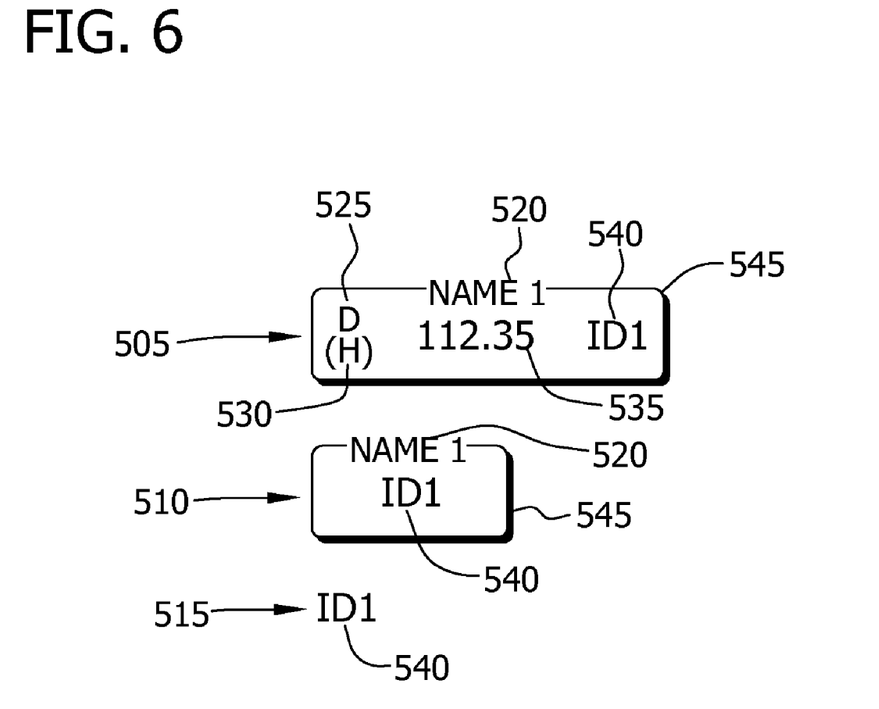
FIG. 6 is an illustration of exemplary labels for a navigation chart.

FIG. 6 is an illustration of exemplary labels for a navigation chart. Depicted are a detailed label 505, a regular label 510, and a simple label 515 for a VOR station. Each of detailed label 505, regular label 510, and simple label 515 includes one or more chart feature attribute indicators. In the exemplary embodiment, detailed label 505 includes a name indicator 520, a distance measuring equipment (DME) indicator 525, a class indicator 530 (e.g., designating a low-altitude and/or high-altitude station), a radio frequency indicator 535, an identifier indicator 540, and an on-airway indicator 545. Regular label 510 includes name indicator 520, identifier indicator 540, and on-airway indicator 545. Simple label 515 includes identifier indicator 540. Some attribute indicators, such as DME indicator 525, class indicator 530, and/or on-airway indicator 545 may be included only if a corresponding feature attribute has a certain value or values. For example, on-airway indicator 545 is displayed only if the on-airway flag of a chart feature has a value of true. Accordingly, the absence of a graphical element, such as the outline box of on-airway indicator 545, may be considered a feature attribute indicator.

One of detailed label 505, regular label 510, and simple label 505 is selected 215 based on dimensions of the unallocated area. In an exemplary embodiment, the label having the largest quantity of feature attribute indicators and positionable within the unallocated area is selected 215. For example, the first label is selected 215 if the dimensions of the unallocated area are sufficient to accommodate the first label. Referring to FIGS. 5 and 6, the dimensions of detailed label 505 may be compared to the dimensions of unallocated area 420 to determine whether detailed label 505 is positionable within unallocated area 420. In one embodiment, a label is considered positionable within unallocated area 420 if unallocated area 420 includes a contiguous portion having dimensions at least as large as the dimensions of the label. In the example of FIG. 5, detailed label 505 is not positionable within unallocated area 420. However, regular label 510 is positionable within unallocated area 420 and is therefore selected 215. Because simple label 515 contains the fewest feature attribute indicators, simple label 515 would be selected 215 only if regular label 510 was not positionable within unallocated area 420.

At least a portion of the unallocated area is allocated 220 to the selected label to create a label area. Referring again to FIG. 5, a label area 430 within unallocated area 420 is shown adjacent to chart feature 415. The selected label is positioned 225 within the label area.

Figure 7:
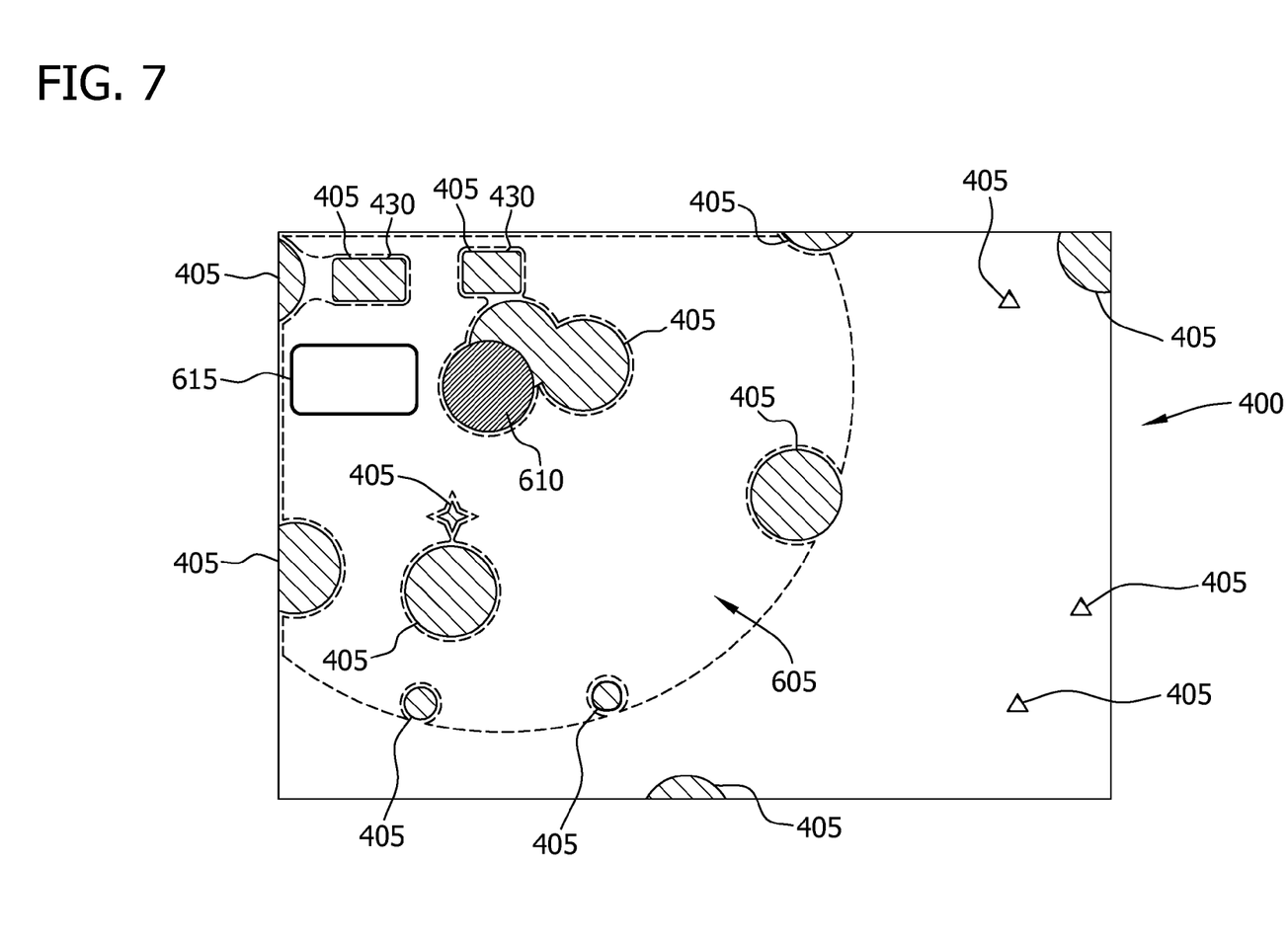
FIG. 7 is an illustration of allocated portions of the navigation chart shown in FIG. 4 as a label is selected for another chart feature.
Figure 8:
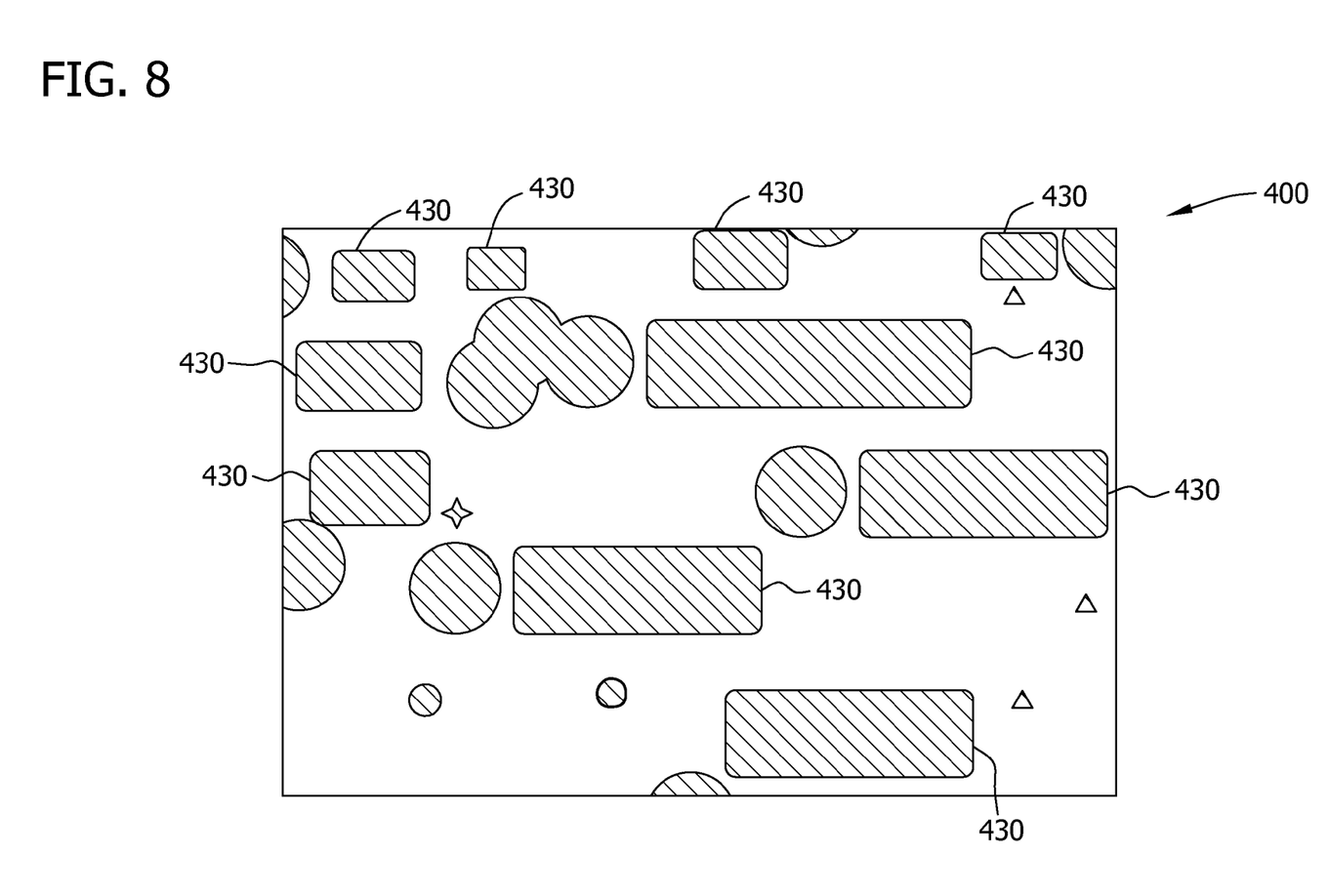
FIG. 8 is an illustration of the navigation chart shown in FIG. 4 after portions of the navigation chart have been allocated to a plurality of labels.

In some embodiments, a plurality of chart feature symbols and labels are positioned in navigation chart 400. Allocating 220 a portion of an unallocated area to a label produces an additional allocated portion within the navigation chart. Accordingly, identifying 205 an unallocated area of the navigation chart for a subsequent chart feature includes identifying a portion of the navigation chart that is not already allocated to a chart feature symbol or a label. FIG. 7 is an illustration of allocated portions 405 of navigation chart 400, including label areas 430. FIG. 7 depicts navigation chart 400 as a portion of an unallocated area 605 is allocated 220 to a label for another chart feature 610, for which another label area 615 is to be created. FIG. 8 is an illustration of allocated portions of navigation chart 400 after portions of navigation chart 400 have been allocated 220 to a plurality of labels. Allocated portions are depicted as hatched areas and include a plurality of label areas 430.

Figure 9:
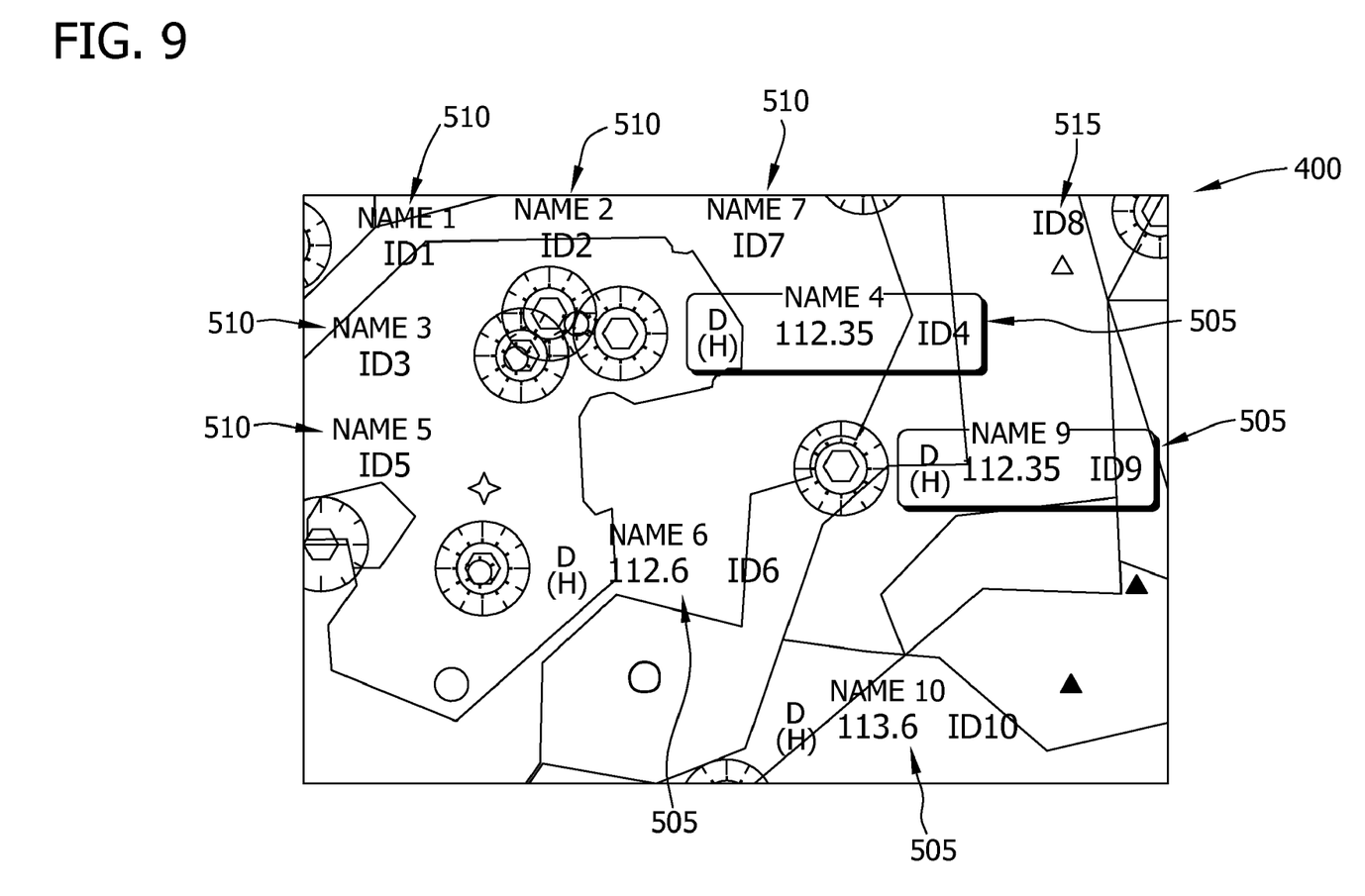
FIG. 9 is an illustration of the navigation chart shown in FIG. 4 after a plurality of labels has been added.

The navigation chart is displayed 230 using a presentation device, which may include, but is not limited to, a display device. FIG. 9 is an illustration of navigation chart 400 after a plurality of labels have been added to a previously unallocated area. Navigation chart 400 includes detailed labels 505, regular labels 510, and a simple label 515.

In some embodiments, the navigation chart corresponds to a geographic area. Method 200 may include determining 250 the geographic area based on a geographic position and/or a geographic orientation acquired from a navigation instrument and/or from a user input device. Method 200 may also include selecting 255, from a first plurality of chart features, each of which has a geographic position, a second plurality of chart features having a geographic position within the geographic area of the navigation chart. The chart feature for which the labels are generated 210 is included in the second plurality of chart features. The second plurality of chart features may include, but is not limited to, one or more navigation aid entities.

In some embodiments, a symbol is positioned 265 within the navigation chart for each chart feature in the second plurality of chart features. For example, a symbol may be positioned 265 based on a geographic position of the symbol. Identifying 205, generating 210, selecting 215, allocating 220, and positioning 225 may be performed for each chart feature within the second plurality of chart features. Alternatively, labels may be displayed selectively by, for example, performing identifying 205, generating 210, selecting 215, allocating 220, and positioning 225 only for specific feature types. Displaying labels for only a subset of feature types facilitates displaying larger and/or more informative labels for feature types of interest and reducing extraneous visual information in a navigation chart.

In some embodiments, chart features are labeled based on a priority. For example, each chart feature may be associated with or include a priority. In one embodiment, each chart feature of the second plurality of chart features includes one or more chart feature attributes, such as a feature type. A feature type may include, but is not limited to, a type of navigation aid entity, such as a VOR station or a waypoint. The chart features are prioritized 260 based on feature type and/or one or more other chart feature attributes. For example, VOR stations may be prioritized 260 above waypoints. Identifying 205, generating 210, selecting 215, allocating 220, and positioning 225 are performed based on the prioritizing 260. For example, prioritizing 260 chart features may include sorting the chart features by feature type, such that labels are positioned for VOR stations before labels are positioned for any other type of chart feature. Such prioritizing 260 of chart features facilitates use of detailed labels for a feature type of interest as often as possible.

Based on the embodiments described above, one skilled in the art will understand that a navigation chart may be dynamically updated as a geographic position changes with minimal shifting of labels. For example, as an aircraft travels, previously undisplayed chart feature symbols may be added, and previously displayed chart feature symbols may be removed. Similarly, if the geographic orientation of the aircraft changes, the geographic area within the navigation chart may be rotated. In either case, the unallocated portion of navigation area available for labels changes, and the process of selecting and positioning labels is repeated. As a result, a chart feature symbol that was previously associated with a detailed label may be associated with a regular or simple label, and a chart feature that was previously associated with a simple label may be associated with a regular or detailed label.

The subject matter of the present disclosure is described with specificity herein to meet statutory requirements. However, the description itself is not intended to limit the scope of this patent. Rather, it has been contemplated that the claimed subject matter might also be embodied in other ways, to include different steps or combinations of steps similar to the ones described in this document, in conjunction with other present or future technologies. Moreover, although the terms "step," "block," and/or "operation" may be used herein to connote different elements of methods employed, the terms should not be interpreted as implying any particular order among or between various steps herein disclosed unless and except when the order of individual steps is explicitly described.

The methods described herein may be encoded as executable instructions embodied in a computer readable medium, including, without limitation, a storage device and/or a memory area of a computing device. Such instructions, when executed by a processor, cause the processor to perform at least a portion of the methods described herein.

This written description uses examples to disclose the described embodiments, including the best mode, and also to enable any person skilled in the art to practice the described embodiments, including making and using any devices or systems and performing any incorporated methods. The patentable scope is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A method for generating a navigation chart having a plurality of allocated areas corresponding to symbols for a plurality of chart features, said method comprising:
   identifying an unallocated area of the navigation chart proximate to a symbol for one chart feature of the plurality of chart features;
   generating a first label and a second label for the one chart feature, the first label comprising a plurality of feature attribute indicators, the second label comprising a subset of the plurality of feature attribute indicators;
   selecting a label from among the first label and the second label based on dimensions of the unallocated area;
   allocating at least a portion of the unallocated area to the selected label to create a label area;
   positioning the selected label within the label area; and
   displaying the navigation chart using a presentation device.

2. The method of claim 1, wherein the navigation chart corresponds to a geographic area, said method further comprising selecting, from a first plurality of chart features having a geographic position, a second plurality of chart features having a geographic position within the geographic area of the navigation chart.

3. The method of claim 2, further comprising:
   repeatedly determining a current geographic area for the navigation chart based on a geographic position acquired from a navigation instrument; and
   displaying the navigation chart based on the current geographic area.

4. The method of claim 2, further comprising, for each chart feature of the second plurality of chart features, positioning within the navigation chart a symbol based on the geographic position of the chart feature.

5. The method of claim 4, further comprising performing said identifying, generating, selecting, allocating, positioning, and displaying for each of the chart features in the second plurality of chart features.

6. The method of claim 5, wherein each chart feature of the second plurality of chart features includes a priority, said method further comprising allocating areas of the navigation chart to labels for chart features based on the priority of each chart feature;
   a feature type, said method further comprising prioritizing the second plurality of chart features based on feature type, wherein performing said identifying, generating, selecting, allocating, positioning, and displaying for each of the chart features in the second plurality of chart features comprises performing said identifying, generating, selecting, allocating, positioning, and displaying based on said prioritizing.

7. The method of claim 2, wherein selecting the second plurality of chart features comprises selecting a plurality of navigation aid entities.

8. The method of claim 7, wherein the one of the chart features comprises a very high frequency omni-directional range (VOR) station, and wherein said generating the first label comprises creating a label including a name of the VOR station, a radio frequency of the VOR station, an identifier of the VOR station, a distance measuring equipment (DME) indicator, a class indicator, and an on-airway indicator.

9. A system for generating a navigation chart, said system comprising:
   a navigation instrument configured to provide a current geographic position;
   a computing device coupled to the navigation instrument and configured to:
      receive the current geographic position from the navigation instrument;
      generate a navigation chart having a geographic area corresponding to the current geographic position and a plurality of chart feature symbols for a plurality of chart features within the geographic area, each chart feature symbol of the plurality of chart feature symbols corresponding to an allocated area of the navigation chart;
      for one chart feature of the plurality of chart features, identify an unallocated area of the navigation chart;
      select, based on dimensions of the unallocated area, a label from a first label having a plurality of feature attribute indicators and a second label having a subset of the plurality of feature attribute indicators, the second label smaller than the first label;
      allocate a portion of the navigation chart to the selected label; and
      cause the navigation chart to be displayed on a presentation device associated with said system.

10. The system of claim 9, wherein the navigation instrument is further configured to provide a current geographic orientation, the computing device is further configured to receive the current geographic orientation, and the computing device is configured to generate a navigation chart by generating a navigation chart having a geographic area corresponding to the current geographic position and the current geographic orientation.

11. The system of claim 9, wherein the computing device is further configured to:
   for one chart feature of the plurality of chart features, determine a first chart feature symbol having a first size and a second chart feature symbol having a second size smaller than the first size;
   select a chart feature symbol from the first chart feature symbol and the second chart feature symbol based on dimensions of an unallocated area of the navigation chart; and
   allocate at least a portion of the unallocated area to the selected chart feature symbol.

12. The system of claim 9, wherein the received current geographic position is a first geographic position received at a first time, the navigation chart is a first navigation chart, and the computing device is further configured to:
   receive a second geographic position from the navigation instrument at a second time subsequent to the first time;
   generate a second navigation chart based on the second geographic position; and
   display the second navigation chart.

13. The system of claim 9, wherein the navigation instrument comprises a navigation instrument of an aircraft.

14. The system of claim 13, wherein the computing device is configured to generate a navigation chart having a plurality of chart feature symbols for a plurality of aeronautical navigation aid entities.

15. A device for generating a navigation chart, said device comprising:
   an input device configured to receive a geographic position of interest;
   a processor coupled to said input device and programmed to:
      generate a navigation chart having a geographic area corresponding to the geographic position of interest and a plurality of chart feature symbols corresponding to chart features having a geographic position within the geographic area;
      for one chart feature symbol of the plurality of chart feature symbols, determine a first label having a plurality of feature attribute indicators and a second label having a subset of the plurality of feature attribute indicators, the second label smaller than the first label;
      select, based on dimensions of an unallocated area of the navigation chart, a label from the first label and the second label; and
      allocate a portion of the navigation chart to the selected label; and
   a presentation device configured to display the navigation chart.

16. The device of claim 15, wherein the input device comprises a user input device.

17. The device of claim 15, wherein the input device comprises a navigation instrument interface configured to receive a geographic position from a navigation instrument.

18. The device of claim 17, wherein the navigation instrument interface is further configured to repeatedly receive a current geographic position from a navigation instrument, the processor is further programmed to repeatedly generate a current navigation chart based on the current geographic position, and the presentation device is further configured to repeatedly display the current navigation chart.

19. The device of claim 15, further comprising a memory area configured to store a plurality of chart features having a geographic position, wherein the processor is coupled to the memory area and programmed to generate a navigation chart by:
   selecting, from the memory area, a plurality of chart features having a geographic position within the geographic area; and
   generating a navigation chart having a plurality of chart feature symbols corresponding to the selected chart features.

20. The device of claim 19, wherein the processor is further programmed to, for each chart feature of the selected chart features:
   determine a first chart feature symbol having a first size and a second chart feature symbol having a second size smaller than the first size;
   select a chart feature symbol from the first chart feature symbol and the second chart feature symbol based on one or more of the following: dimensions of the first chart feature symbol, dimensions of the second chart feature symbol, dimensions of an unallocated area of the navigation chart and a scale of the navigation chart; and
   allocate at least a portion of the navigation chart to the selected chart feature symbol.

* * * * *